United States Patent [19]

Hendrick et al.

[11] 3,862,262

[45] Jan. 21, 1975

[54] LACTAM-POLYOL-ACYL POLYACTAM TERPOLYMERS

[75] Inventors: Ross Melvin Hendrick, Creve Coeur; James D. Gabbert, St. Louis, both of Mo.

[73] Assignee: Monsanto Company, St. Louis, Mo.

[22] Filed: Dec. 10, 1973

[21] Appl. No.: 423,591

[52] U.S. Cl. ..... 260/857 PG, 260/78 A, 260/857 D, 260/857 G, 260/857 PE
[51] Int. Cl. ............................................. C08g 41/04
[58] Field of Search.... 260/857 PG, 857 PE, 857 D, 260/857 G

[56] References Cited
UNITED STATES PATENTS

| | | | |
|---|---|---|---|
| 3,384,681 | 5/1968 | Kobayashi | 260/857 PG |
| 3,522,329 | 7/1970 | Okazaki | 260/857 PG |
| 3,549,724 | 12/1970 | Okazaki | 260/857 PG |
| 3,636,135 | 1/1972 | Garforth | 260/857 PG |
| 3,639,502 | 2/1972 | Okazaki | 260/857 PG |

*Primary Examiner*—Paul Lieberman

[57] ABSTRACT

Lactam-polyol-acyl polylactam terpolymers having both ester linkages and amide linkages between the monomeric segments of the terpolymer are disclosed. Also disclosed is a process for preparing the above terpolymers comprising reacting together a lactam, polyol and acryl polylactam in the presence of a basis lactam polymerization catalyst to form a lactam-polyol-acyl polylactam terpolymer.

21 Claims, No Drawings

LACTAM-POLYOL-ACYL POLYACTAM TERPOLYMERS

BACKGROUND OF THE INVENTION

This invention pertains to lactam-polyol-acyl polylactam terpolymers and their process of preparation.

Polyamides comprise a large class of polymers having a wide range of properties. Many polyamides have excellent combinations of properties for particular applications. One important class of polyamides are the polylactams prepared by the polymerization of lactams such as caprolactam and the like. Polycaprolactam, more commonly known as nylon 6, is the most widely used of the polylactams because of its excellent mechanical and physical properties and its low cost. Because of the many desirable properties of polylactams, polylactams other than polycaprolactam have been used to a considerable extent when nylon 6 is unsuited to some specific end use. Nylon 12, manufactured from lauryllactam or 12-aminododecanoic acid, is an example of such a polymer. The foregoing polymer is characterized by lower water absorption and consequently better dimensional stability and electrical properties than nylon 6. Nylon 12 is also more flexible and lower melting than nylon 6.

For still other applications, a polyamide having a higher water absorption coupled with a higher elasticity than nylon 6 would be useful for a number of applications. Some nylon copolymers are known to provide the characteristics just mentioned. Polyamide-polyether copolymers are known to have a combination of properties making them suitable for use as fibers, fabrics, films and molded articles. It is also known that lactam-polyol copolymers can be prepared by the base catalysis of lactams in the presence of polyalkylene glycols or other polymerizable polyol intermediates using isocyanate initiators. This method of polymerization yields a block copolymer with a number of good properties at a reasonable cost. One of the principal disadvantages of the polylactam-polyether copolymers prepared by this method has been the poor heat stability of the copolymers.

SUMMARY OF THE INVENTION

If a means could be found for improving the heat stability of lactam-polyol copolymers prepared by an anhydrous base-catalyzed polymerization, it would represent a significant advance in the state of the art. Providing a heat-stable lactam-polyol polymer constitutes one of the principal objects of this invention.

The present invention pertains to lactam-polyol-acyl polylactam terpolymers having both ester linkages and amide linkages between the monomeric segments of the terpolymer.

The invention also pertains to a process for preparing the above polymers comprising reacting together a lactam monomer, a polyol and an acyl polylactam in the presence of a base catalyst for the anhydrous polymerization of a lactam.

Related terpolymers and a process for preparing same are disclosed in pending U.S. application, Ser. No. 341,215, filed Mar. 14, 1973 entitled Lactam-Polyol-Polyacyl Lactam Terpolymers and is hereby incorporated by reference. Ser. No. 341,215 was filed by applicants Ross M. Hedrick and James D. Gabbert and is incorporated herein for the purpose of more fully disclosing the background of the invention. Since the lactam-polyol-polyacyl lactam terpolymer of Ser. No. 341,215 is similar to the lactam-polyol-acyl polylactam terpolymer of the invention, incorporation of the discussion of the polyol components and their influence on the physical profile of these related terpolymers is thought to be relevant to the invention.

DESCRIPTION OF THE PREFERRED EMBODIMENTS

The polymerized lactam component of the above polymers is formed from cyclic monomeric lactams of the formula

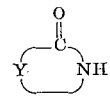

where Y is an alkylene group having at least about 3 carbon atoms, preferably from about 3 to 12 or 14, and more preferably from about 5 to about 11, carbon atoms.

A preferred monomer is ε-caprolactam. Lactam monomers in addition to ε-caprolactam include alpha-pyrrolidinone, piperidone, valerolactam, caprolactams other than the ε-isomer, capryllactam, lauryllactam and the like. In addition to lactams unsubstituted on their carbon chains, lactams having substituents on the carbon chain which do not inhibit or otherwise adversely affect the polymerization of the lactam are also included within the scope of this invention.

During polymerization the cyclic lactam ring is opened to provide the following monomeric unit

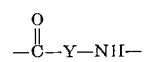

which, together with other lactam molecules, produces a polymeric block of the formula

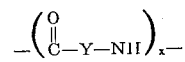

where $x$ is an integer greater than one and where Y is as defined above.

The monomeric lactam unit can also react with the acyl polylactam. Similarly, a polylactam block, when joined with an acyl polylactam, forms a polymer segment of the formula

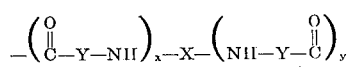

where X is an acyl group, $x$ is an integer greater than one and $y$ is an integer equal to or greater than one.

Thirdly, in the course of the polymerization of the components described above, a polyol can react with the polymerizable lactam unit or block to produce a polymer segment of the formula

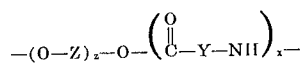

where $x$ and $z$ are integers equal to at least one and where Z is a hydrocarbon, substituted hydrocarbon or acylated hydrocarbon group which, together with the oxygen atom attached thereto, forms a polyether or polyester segment of a polymer molecule.

The Z hydrocarbon, substituted hydrocarbon and acylated hydrocarbon groups can be of any size but are preferably limited to about six carbon atoms. Even more preferred are unsubstituted aliphatic groups such as methylene, ethylene, propylene, butadienyl and the like. Other suitable Z groups include phenylene, chlorophenylene, tolylene, isobutylene, isopropylene, ethylcarbonyl, propylcarbonyl, ethylsulfonyl, propylthiocarbonyl and the like.

The preference indicated above for unsubstituted aliphatic Z groups means that terpolymers of this invention which contain polyether segments are preferred over other embodiments which contain polyester segments.

In preferred aspects of this invention, it is theorized that the lactam is present in the polymer in the form of polylactam blocks which are alternated with blocks of polyol to form the polymer. The polylactam blocks when present can be of any size but customarily have molecular weights of at least about 500, preferably at least about 1,000.

The polymerized polyol components of the polymers of this invention are formed from polyol intermediates having at least two hydroxy groups. Included within the scope of the above class are a large number of suitable compounds ranging from the simple diols such as ethylene glycol to complex polymeric polyols such as poly (ε-caprolactone) diol. Other polyol compounds include alkylene glycols such as diethylene glycol, triethylene glycol, tetraethylene glycol, tetramethylene glycol, propylene glycol, dipropylene glycol, hexylene glycol, 1,2-propanediol, 1,3-propanediol, 1,3-hexanediol, 1,5-pentenediol, butylene glycol, 1,4-butanediol, dicyclopentadiene glycol, heptaethylene glycol, and isopropylidene bis (p-phenyleneoxypropanol-2); diols other than alkylene glycols such a pyrocatechol, resorcinol, hydroquinone, hydroxyethyl acrylate and hydroxypropyl methacrylate; polyols having more than two hydroxy functions such as glycerol, pentaerythritol, 1,2,6-hexanetriol, 1,trimethylol propane, pyrogallol and phloroglucinol; polymeric polyols such as polyethylene glycols, polypropylene glycols, polyoxypropylene diols and triols, castor oils, polybutadiene glycols and polyester glycols, and a large number of compounds containing substituents other than hydroxy groups such as 2,4-dichlorobutylene glycol and 2,2'-4, 4' bis (chlorohydroxyphenyl) ether. In addition to all the hydroxy compounds set forth above, the thio compounds analogous to the above compounds having sulfur atoms in place of oxygen are also included within the scope of the invention. A few examples include hydroxyethyl thioglycolate, ethylene glycol bis(thioglycolate), pentaerythritol tetrakis- (thioglycolate) and thiodiglycol.

If the polyol intermediate is a polymer, the molecular weight of the polyol can be any amount. Commercially available polymeric polyol compounds have molecular weights from 200 to 5,000, but polymers with molecular weights outside that range are also useful in the practice of the instant invention.

The third component of the terpolymers of this invention has the following structural configuration in the polymer chain:

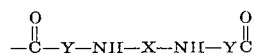

where X is an acyl group, for example, carbonyl or phosphoryl and the Y groups are alkylene groups having at least three carbon atoms.

When X designates a phosphoryl group,

there will be another group attached to the phosphorus atom in addition to the two amide groups. The additional group can be either another amide group or some other group such as hydrogen, halogen or monovalent hydrocarbon. When X represents a carbonyl group,

there will be only two amide groups attached to the carbonyl group.

The polymerized product comprising the aforementioned components can have a number of different structures depending upon the process conditions and the relative proportions of ingredients used in the reaction system. Polymers can be prepared having relatively small segments of lactam units joined to similarly short segments of polyol units through the acyl linkage described above. Or large segments of one polymeric component can be combined with a larger number of comparatively small segments of another polymeric unit, which small segments are joined to one another through the acyl linkage as well as to the other type of polymeric component. Or segments of varying sizes of both the lactam and the polyol polymeric units can be combined through the acyl components to form a highly random terpolymer. Another form of polymer within the scope of this invention are block polymers, where moderately large size blocks or segments of the lactam and polyol polymeric units are positioned alternately in the polymer chain and joined through the acyl group described above. If the acyl linkages are, for purposes of simplification, considered to be a part of either a lactam or polyol block, then the block polymers of this invention can be discussed in terms of two alternating blocks designated as A and B blocks, instead of in terms of complicated patterns of three blocks designated as A, B and C blocks. Block polymers of this invention can have three general structural configurations, AB, ABA and a repeating pattern of AB segments. Following a general characterization of a block copolymer within the scope of this invention as AB, ABA or repeating AB, it should be recognized that the exact structural configuration may vary somewhat from the general characterization of the polymer. As an illustration, one theoretical formula for a lactam-polyolacyl polylactam block terpolymer of the repeating AB type could be

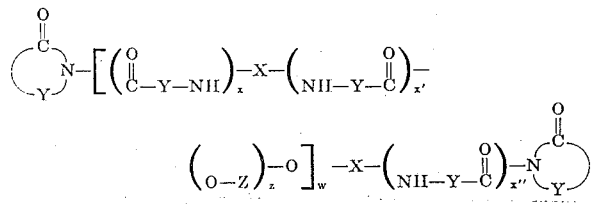

where $x$, $x'$, $x''$, $z$ and $w$ are all integers equal to one or more, Z is a divalent hydrocarbon group, Y is an alkylene group having at least three carbon atoms, and X is an acyl group.

If for instance Y is a straight chained amylene group, X is a carbonyl group, and Z is ethylene, —CH$_2$ CH$_2$, the terpolymer would be a caprolactam-ethylene glycol polymer where the caprolactam segments of the polymer are joined to one another and to the ethylene glycol segments through carbonyl linkages. Other lactam-polyol polymers, both of the AB, ABA as well as the repeating AB type, will become immediately apparent to those skilled in the art in view of this disclosure. It should therefore be noted that the above structural formula is set forth for illustrative purpose only, and is not intended as a limitation of the polymers within the scope of the invention.

When the polymers of this invention are of the ABA type, where one block of one type of polymer segments is located between two blocks of the other type of polymer segment, the polymers can be of either the polyol-lactam-polyol type or the lactam-polyol-lactam type. Of the two types, the latter is a preferred type of ABA polymer.

If the lactam-polyol-acyl polylactam polymer is a block polymer, the polyol blocks can, like the polylactam blocks, be of any size but customarily have molecular weights of at least about 500, preferably at least about 1,000. The ratio of the number of lactam to polyol blocks can also vary. Since the block polymers can be of either the type designated as AB, ABA or repeating AB, the ratio of lactam blocks to polyol blocks can vary from 2:1 to 1:1 to 1:2. Mixtures of two or more block polymers having different ratios of the lactam and polyol blocks will produce ratios of polymer blocks intermediate between the above stated ratios.

In the above theoretical formula for a lactam-polyol block terpolymer, the acyl polylactam linkage is represented as located between two lactam polymer segments as well as between a polyether segment and a lactam polymer segment. As a practical matter, the acyl linkages will also be located occasionally between two polyol blocks. It should be noted, moreover, that the acyl linkages need not invariably be positioned between lactam and polyol blocks since the necessary or amide linkage can be provided in the form of an ester linkage by the oxygen atom of the polyether segment and the carbonyl group of a polylactam segment.

As mentioned earlier, the terpolymers of this invention are characterized by the presence of both ester and amide linkages between the monomeric segments of the polymer. The term "monomeric segment" is intended to apply to the polymerized reaction product of a monomer, whether the reaction product is a single unit such as

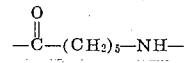

or a block of several units such as

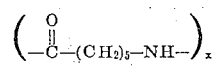

Regarding the breadth of the terms "ester linkage" and "amide linkage," the linkages can of course be composed of phosphoryl groups instead of carbonyl groups, since the polyacyl linkage described above includes thiocarbonyl, sulfonyl, and phosphoryl groups as well as the more conventional carbonyl groups.

The molecular weight of the terpolymers can vary widely from a number average molecular weight of just a few thousand to 1 million or higher. For thermoplastic uncrosslinked polymers, a preferred range for number average molecular weight is from about 10,000 or 20,000 to about 100,000 to 200,000. If the polymers are crosslinked, the molecular weights of the polymers can be much higher in the range of 100,000 to several million.

When block polymers are formed, the molecular weight of the polyol blocks is an important consideration in selecting preferred polymers within the scope of this invention. Polyol blocks having a number average molecular weight of about 500 or 600 generally tend to have good low temperature properties. This minimum level of molecular weight for the polyol blocks is subject to some variation insofar as low temperature properties can also be affected by the degree of block polymerization, the nature of the block polymer, i.e. AB, ABA or repeating AB, the ratio of the lactam content to the polyol content, and the particular lactam and polyol present in the polymer. Regarding a maximum molecular weight of the polyol blocks preferred polymers have polyol blocks with a maximum number average molecular weight of about 6,000, and more preferably about 4,000. Above these levels the polyol prepolymer tends to exhibit a reduced hydroxyl functionality, thereby making more difficult the incorporation of polyether into the polymer.

In addition to the three principal monomeric constituents which together produce the terpolymers of this invention, other polymerizable monomers can also be used to prepare polymers having four or more polymerizable constituents. As an example, if the polyol constituent of a terpolymer of this invention is polybutadiene diol, the resultant terpolymer could be, after the lactam-polyol-acyl polylactam polymerization, subsequently reacted with a vinyl compound such as styrene to crosslink the polymer through its vinyl unsaturation. Still other monomers could be chosen which could be polymerized directly into a linear polymer chain. The quantity of such additional monomers could be very large, even as great as 50% or more of the total polymerizable constituents, but preferably is limited to quantities of 25% or less of the total monomer content.

The polymers of this invention exhibit a broad range of properties which can be adjusted to provide compositions particularly well adapted for a specified end use. In addition to crosslinking, adjustment of polymer structure, and molecuar weight adjustment of polymer blocks, other means of varying the properties of the polymers can also be employed. Crystallinity of the polymers, which can be present in the lactam segments of the polymers, can be increased or decreased by variation of polymerization temperatures. Since any crystallinity in the polymers of this invention is largely present in the lactam segments of the polymer, variation of the lactam content of the polymer can also result in a variation of polymer crystallinity. Polymers with relatively high degrees of cristallinity tend to be strong, rigid polymers whereas those with little or no crystallinity are more elastomeric in nature.

As mentioned earlier, the type of lactam, polyol and acyl polylactam components can also affect the properties of the finished polymer. As an example, polyethylene glycol polymer segments tend to produce polymers with a high water absorptivity whereas polypropylene glycol or polytetramethylene glycol polymer segments produce polymers with comparatively low water absorptivities. As another example, caprolactam polymer segments in the polymers of this invention produce polymers which are stronger and more rigid than homologous polymers containing segments of a higher lactam such as capryllactam or dodecanolactam. With respect to the acyl polylactam, an aromatic hydrocarbon group between the acyl polylactam groups will produce a more rigid terpolymer than will an acyl polylactam with a long-chain aliphatic group. Even more significantly, use of a lactam will yield an essentially linear polymer whereas use of a tris or tetrakislactam will result in a branched or crosslinked terpolymer. Similarly bis-lactams can be employed to produce a branched or crosslinked polymer. Highly crosslinked polymer can be made through the use of polyols having more than two hydroxy groups.

With all of the foregoing techniques available for modifying and adjusting the properties of the polymers of this invention, it can be appreciated that the polymers can be used in a number of end use applications. One such use is as textile fiber. Throughout the entire range of ratios of polymeric components, from polymers containing very little polyether component to those containing a large amount, the polymers have properties which make them useful as textile fibers. In addition to being the sole constituent of a textile fiber, the terpolymers can also be used as one component in a composite or conjugate fiber. It is contemplated that conjugate fibers of nylon and the terpolymers of this invention will be particularly useful in a number of textile and other applications. Other textile applications for the terpolymers include their use in the manufacture of nonwoven fabrics and as high moisture regain fibers. The terpolymers can also be manufactured into foamed articles, either during or after their polymerization, to produce rigid and flexible foams. Because of their method of preparation directly from the monomeric components, the polymers can be prepared in large shapes such as furniture and furniture components and automobile parts. The terpolymers can also be produced in the form of molding resins which can subsequently be molded by injection molding, extruding, thermoforming or other techniques to produce products of virtually any shape. The more highly elastomeric compositions can be used in the manufacture of automobile tires and tire components. The polymers can also be modified with fillers, fibers, pigments, dyes, stabilizers, plasticizers, flame retardant and other polymeric modifiers to alter their properties and thereby enlarge even further the scope of their applicability. One such modification comprises reinforcing the polymers with fillers or fibers which have been treated with coupling agents capable of increasing the bonding of the fillers or fibers to the polymer molecules. A large number of organosilane compounds have been found to be especially capable of performing this task of improving adhesion between polymer and filler or fiber. Examples of some suitable organosilane couplers for use with the polymers of this invention include 3-aminopropyl triethoxysilane, glycidoxypropyl trimethoxysilane and N-trimethoxysililpropyl-N-beta-aminoethyl)-amine. Preferred fillers and fibers include quartz, wollastonite, feldspar, calcined kaolin clay, glass fibers and other high performance fibers such as graphite, boron, steel and the like. The concentrations of fillers and fibers can vary from very small amounts such as one or two volume percent up to 70 or 80 volume percent or more.

The polymers are prepared by mixing together lactam monomer, polyol, lactam polymerization catalyst and an acyl polylactam of the formula

where X is an acyl group selected from

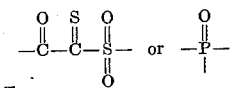

where Y is an alkylene group having at least about three carbon atoms, and where y is an integer equal to one when X is carbonyl and equal to one or two when X is phosphoryl, and conducting the polymerization of the lactam, polyol and acyl polylactam under conditions which will cause the lactam to polymerize.

Polymerization temperatures can vary from the melting point of the lactam or less up to the melting point of the resultant polymer or more. Depending upon the particular ingredients being used, this can encompass a range from 70° to 230°C or more. Preferred polymerization temperatures are from about 90° to about 190°C, and more preferably from about 120° to about 180°C for caprolactam terpolymers. Even more preferred is a polymerization where the temperature is increased during the polymerization from an initial temperature of from about 70° to about 100°C at the beginning of the polymerization to a final temperature of about 150° to 180°C. Such a technique produces a rapid polymerization of a terpolymer having high strength and modulus.

Times required for complete polymerization will vary considerably depending upon polymerization temperatures and the specific ingredients used in the polymerization system. Total polymerization time can be as little as 30 seconds or less, preferably from 1 to 10 minutes, and can be extended to any duration up to several days or more. Generally, polymerization times of from 1 to 10 minutes are preferred for most polymerization systems.

The lactam monomer and polyol used in the polymerization have both been described in ample detail above. The lactam polymerization catalyst useful herein includes that class of compounds commonly recognized as suitable basic catalysts for the anhydrous polymerization of lactams. In general, all alkali or alkaline earth metals are effective catalysts either in the metallic form or in the form of hydrides, halohydrides, alkylhalides, oxides, hydroxides, carbonates and the like. Also useful are a number of organometallic compounds of the metals mentioned above such as metal alkyls, metal phenyls, metal amides and the like. Examples include sodium hydride, potassium hydroxide, lithium oxide, ethyl magnesium bromide, calcium fluorohydride, strontium carbonate, barium hydroxide, methyl sodium butyl lithium, potassium phenyl, diphenyl barium, sodium amide and magnesium diethyl. All of the foregoing compounds react with the lactam monomer to form the metal lactam, which is the active catalytic agent in the lactam polymerization mechanism. The metal lactam catalyst can therefore be formed in situ by reaction of one of the foregoing metals or metal compounds with lactam monomer in the polymerization medium or by prior reaction of the metal or metal compound with a stoichiometric quantity of lactam monomer. Examples of metal lactam catalysts include sodium caprolactam, magnesium caprolactam, bromomagnesium pyrrolidinone, chlorocalcium caprolactam and the like. Catalyst concentrations can range from a fraction of one mole percent to 15 or 20 or more mole percent of the lactam monomer to be polymerized.

The acyl polylactam linkage, as well as the ester and amide linkages, are incorporated into the polymer chain through the reaction of the acyl polylactam with the lactam and polyol constituents. In the formula set forth above for the acyl polylactams useful herein, the X group can be for example, either a carbonyl or phosphoryl group having the necessary number of available valences to bond to itself all of the substituent groups included in the compound. If X is carbonyl, the only substituents attachable to the carbonyl group are lactam groups. If X is phosphoryl, there can be attached to the phosphorus atom of the phosphoryl group either two or three lactam groups. If only two lactam groups are attached to the phosphorous atom, the third group can be hydrogen, halogen, monovalent hydrocarbon or the like. The monovalent hydrocarbon group can be of any size but preferably contains a maximum of 8 or 10 carbon atoms. Examples of suitable hydrocarbon groups include phenyl, tolyl, biphenyl, methyl, ethyl, hexyl and vinyl. Suitable halogen groups include fluoro, chloro, bromo and iodo groups, with chloro groups being particularly preferred. The Y group can represent any alkylene chain having from 3 to 14 or more carbon atoms, preferably from about 3 to about 10 carbon atoms. Preferred among the class of acyl polylactams included within the scope of the formula given above are those where the X group is a carbonyl group. Particularly preferred is that compound where X is carbonyl and the two lactam groups attached thereto are caprolactam groups.

Examples include carbonyl bis-caprolactam, i.e.,

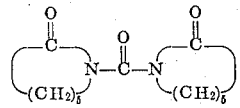

carbonyl bis-valerolactam, carbonyl bis-pyrrolidinone, carbonyl bis-piperidone, carbonyl bis-capryllactam, carbonyl bis-dodecanolactam, chlorophosphoryl bis-pyrrolidinone, phosphoryl bis-caprolactam, phospryl tris-capryllactam, phenylphosphoryl bis-caprolactam, toluyl-phoryl bix-dodecanolactam, bromophosphoryl bis-valerolactam and chlorphosphoryl bis-caprolactam.

The amount of acyl polylactam useful in the preparation of the terpolymers of this invention depends upon the quantities of lactam and polyol being used. For preferred polymerizations, it is desirable that the acyl polylactam be present in an amount from 100 to about 500, preferably from about 100 to about 200, equivalent percent of the polyol. If the acyl polylactam is present in an amount less than a molecularly equivalent amount based on the polyol, polyol prepolymer formation occurs, but the subsequent lactam polymerization is very slow. In those preferred polymerization systems where the acyl polylactam concentration exceeds the amount stoichiometrically equivalent to the polyol, the excess can be from 0.01 to about 30 or more mole percent of the lactam monomer. A preferred range is from about 0.1 to about 10 mole percent of the lactam monomer, and more preferably from about 0.2 to about 5 mole percent of the lactam monomer.

The lactam and polyol can be present in any relative proportions ranging up to 99 parts of either component to 1 part of the other. Preferred ratios of the two polymer-forming materials depend upon the end use to which the finished polymer is to be put. For end use applications requiring strong rigid materials, the lactam content of the polymerizable medium should be relatively high such as 60 or 80 or even 90% or more lactam. For other applications where elastomeric properties such as high elongation or where water absorption is desirable, the relative proportions of the two monomers can be reversed so that the polymerizable medium will contain 60 or 80 or 90% or more of the polyol compound. Polymers containing about equal quantities of both lactam and polyol are preferred for a great many uses because of the advantageous combination of properties achieved by such polymers.

EXAMPLE 1

A reactor vessel was charged with 106.3 grams of caprolactam, 131.1 ml of triethylamine, and 300 ml of chloroform. Over a 45 minute period, 45.8 grams of phosphoryl chloride was added to the other reactants at a temperature of from 25°–30°C. The admixture was then stirred at room temperature for about 7 hours with slightly exothermic conditions resulting during the first 30 minutes of stirring. A portion of the reaction admixture was filtered and the filtrate evaporated yielding 67 grams of a dark semi solid product. The product was treated further by slurring with benzene, filtering, and evaporating the filtrate; again slurring with benzene, and washing with water followed by evaporation which yielded 17.3 grams of an amber viscous product. The product (phosphoryl tris-caprolactam) was utilized as an initiator in the following lactam-polyol-acyl polylactam formation.

A reactor vessel was charged with 30 grams of Voranol 2,000 (polyoxypropylene polyols having a molecular weight of 2,011), 65.5 grams of caprolactam, and 4.48 grams of the phosphoryl triscaprolactam initiator which was 0.67 grams in excess of the molecular equivalence required by 30 grams of Voranol 2,000. Twenty four millimoles of the polymerization catalyst, bromo magnesium pyrrolidone, was added in 3 portions at a reaction mixture temperature of from 160° to 165°C. After 20 minutes the viscosity increased and the bottom part of the reaction admixture became opaque and set to solid polymer.

EXAMPLE 2

A reactor vessel was charged with 56.5 grams of (0.5 mole) caprolactam, 71.7 ml. triethylamine, and 400 ml. benzene. Twenty-four grams of phosgene was bubbled into the reaction admixture for 20 minutes at a temperature of from 25° to 35°C. The admixture was stirred for 3 hours at a temperature of from 40°–60°C, filtered, and the product containing filtrate was washed twice with 100 ml water and evaporated yielding a mixture of semiviscous liquid and crystals. Recrystallization of the product with isopropoinol resulted in 33.2 grams of product (carbonyl bis-capro-lactam). The product was utilized as an initiator in the following lactam polyol-acyl polylactam formation.

A reactor vessel was charged with 3 grams (1.52 millimoles) of Voranol 2,000 (polyoxypropylene polyols) and 6.5 grams of caprolactam. The charged vessel was heated at 150°C for 15 minutes with bubbling nitrogen in order to remove water. The charge was cooled to 70°C under nitrogen and 0.53 grams (2.1 millimoles) of carbonyl bis-caprolactam was added. The reaction mixture was heated to 100°C to dissolve the initiator and cooled to 70°C before 0.3 millimoles of bromomagnesium pyrrolidone catalyst was added representing 10 millimoles of catalyst per mole of caprolactam. The catalyst was admixed with the reaction mixture and the admixture was heated to 160°C under nitrogen atmosphere. Viscosity increase was noted after 5 minutes and the nitrogen bubble system removed. The lactam-polyol-acyl polylactam terpolymer had set firm but was penetrable at 10 minutes. Complete set occurred at 12 minutes.

EXAMPLE 3

A reactor vessel charge of 75 grams Voranol 2000 (polypropylene polyols having a molecular weight of 1,974), 194 grams of caprolactam, and 1.25 grams Flectol H (polymerized 1,2-dihydro-2,2,4-trimethylquinoline) was heated under a vacuum to remove water. Isophthaloyl bis-caprolactam (17.1 grams) was added to the charge and the admixture was heated again to remove water. A total of 50 grams of caprolactam was distilled during the two drying stages. The admixture was cooled to 65°C and 13.95 ml of catalyst (bromo magnesium caprolactam -0.4 molar in caprolactam) was added and degassed for 1 minute. The reaction mixture was poured into a 100°C sheet mold, resulting in a thickness varying between one-eighth and one-half inch. The mold was heated to 160°C over a 20 minute period and held at 160°C for an additional 30 minute period. The lactam-polyol-polyacyl lactam terpolymer set in 6 minutes after introduction to the press. The mold was opened after the 30 minute period and the finished polymerized composition was removed.

The compositions of Example 3 and the following Examples 4 and 5 were tested to determine their mechanical properties, which are reported in the table following Example 5. The process and product of Example 3 are not according to the invention and are presented for comparative purposes. Examples 4 and 5 as well as Examples 1 and 2 are in accordance with the invention.

EXAMPLE 4

A reactor vessel was charged with 37.5 grams of Voranol 2000 (polyoxypropylene polyols having a molecular weight of 1975), 104 grams of caprolactam, and 0.62 grams Flectol H (polymerized 1,2-dihydro-2,2,4-trimethylquinoline) and heated to a temperature of 125°C with 25 grams of caprolactam being distilled under vacuum. Phenylphosphorodi (2-hetohexamethyleneimino) amide initiator (8.35grams) was added to the mixture and stirred until dissolved. A catalyst solution, 8.39 ml. of 2 molar chromo magnesium pyrollidone in N-methyl-pyrrollidone representing 24 millimoles of catalyst per mole of caprolactam was added to the reaction mixture at a temperature of 120°C. The reaction mixture was poured into a sheet mold which was at 160°C. The lactam-polyol-acyl polylactam terpolymer set in 5 to 6 minutes after introduction to the mold. The mold was opened 30 minutes after set and the finished polymerized composition was removed for testing as reported in the table following Example 5.

EXAMPLE 5

A reactor vessel was charged with 37.5 grams of Voranol 2000 (polyoxypropylene polyols having a molecular weight of 1975), 103.8 grams of caprolactam, and 0.62 grams of Flectol H (polymerized, 1,2-dihydro-2,2,4-trimethylquinoline) and was heated to 125°C for 2 to 3 minutes with 25 grams of caprolactam being distilled under vacuum. Phenylphosphoro di(2-ketohepamethyleneimino) amide initiator (8.35 ml) was added to the mixture. A catalyst solution, 8.35 ml. of 2 molar bromo magnesium pyrrolidone in N-methylpyrrolidone was added to the reactive mixture under the conditions of Example 4. The product was poured into the same mold as was used in Examples 3 and 4 which was at a temperature of 160°C. The lactam-polyol-acyl polylactam terpolymer set in about 9 minutes. The mold was opened 30 minutes after set and the finished polymerized composition was removed for testing as reported in the following table.

| | Catalyst | | | | Strength, p.s.i. | | | | Elongation, percent | | Modulus p.s.i.×10⁻⁴ | | $\frac{Mn}{\times 10^{-3}}$ | $\frac{Mw}{\times 10^{-3}}$ | $\frac{Mw}{Mn}$ |
|---|---|---|---|---|---|---|---|---|---|---|---|---|---|---|---|
| Example | Initiator* | Identity | Mil/ mole capro | Set time, min. | Extract- ables, percent | Melt index, gr./min. | 5% | 100% | 300% | Yield | Fail | Yield | Fail | Sec. | Ton | | | |
| 3 | Isophthaloyl-bis-caprolactam | CMgBr a | 4 | 4 | 1.62 | No flow | 2,913 | 3,970 | 4,060 | 3,870 | 6,399 | 23 | 547 | 5.80 | 7.59 | 24.2 | 83.4 | 3.41 |
| 4 | Phenylphosphonodi(2-ketohexamethyleneimino) amide | BMP b | 24 | 5.6 | 5.21 | 0.2 | 4,265 | 4,100 | | 4,470 | 4,150 | 10 | 66 | 8.53 | 12.12 | | | |
| 5 | Phenylphosphorodi(2-ketohexamethyleneimino) amide | BMP | 24 | 9 | 4.25 | NF | 2,901 | | | | 3,990 | | 207 | 5.80 | 8.81 | | | |

*Initiator/glycol ratio 1:1.263; Glycol-Voranol 2000.

Of the related terpolymer of Example 3 and Examples 4 and 5, a distinguishing feature as present in the above table is the catalyst requirements of 4 millimoles per mole of caprolactam (Example 3) as compared to the 24 millimoles per mole of caprolactam (Examples 4 and 5). This difference is attributable to the polyacyl lactam initiator of Example 3 and the acyl polylactam initiator of the invention as presented by Examples 4 and 5. The remaining comparison of physical properties indicates similar, yet different terpolymers which is in agreement with the discussions and formulations of the invention.

What is claimed is:

1. A lactam-polyol-acyl polylactam block terpolymer having the general formula:

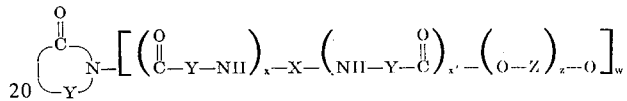

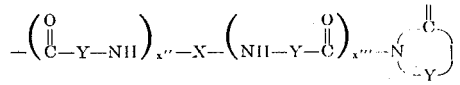

wherein $(O-Z)_z$ is a polymeric moiety and Z is a hydrocarbon or substituted hydrocarbon group said group being alkylene, arylene, alkylene carbonyl, arylene carbonyl, and mixtures thereof;

X is an acyl group selected from

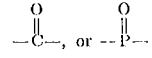

Y is an alkylene or substituted alkylene having from about 3 to about 14 carbon atoms;

$x, x', x''$, and $x'''$ are integers and the total number of $x$'s equal to $2w + 2$; and $z$ and $w$ are integers equal to one or more.

2. A block terpolymer according to claim 1 wherein the lactam portion of the terpolymer is formed from a lactam of the formula

where Y is an alkyelen group having at least about 3 carbon atoms.

3. A block terpolymer according to claim 1 wherein the lactam is ε-caprolactam.

4. A block terpolymer according to claim 1 wherein the polyol portion of the terpolymer is formed from an alkylene glycol.

5. A block terpolymer according to claim 1 wherein said alkylene glycol is a polyalkylene glycol having a molecular weight of at least about 1,000.

6. A block terpolymer according to claim 1 wherein said polyalkylene glycol is polyethylene glycol.

7. A block terpolymer according to claim 1 wherein said polyalkyelen glycol is polypropylene glycol.

8. A block terpolymer according to claim 1 wherein said polyalkylene glycol is polytetramethylene glycol.

9. A block terpolymer according to claim 1 wherein the polyol portion of the terpolymer is formed from polybutadiene diol.

10. A block terpolymer according to claim 1 wherein the polyol portion of the terpolymer is formed from a polyester.

11. A block terpolymer according to claim 1 wherein said polyester is polycaprolactone diol.

12. A block terpolymer according to claim 1 wherein the acyl groups of all of said ester and amide linkages are carbonyl groups.

13. A copolymer according to claim 1 wherein said block terpolymer is of the repeating AB block structure.

14. A process for preparing lactam-polyol acyl polylactam terpolymers having the general formula:

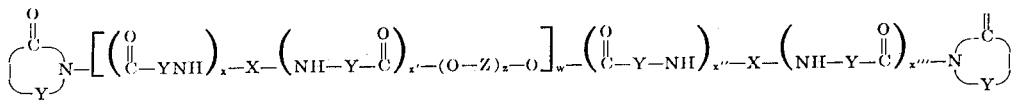

Wherein $(O-Z)_z$ is a polymeric moiety and Z is a hydrocarbon or substituted hydrocarbon group said group being alkylene, arylene, alkylene carbonyl, arylene carbonyl, and mixtures thereof;

X is an acyl group selected from

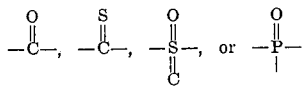

Y is an alkylene or substituted alkylene having from about 3 to about 14 carbon atoms;

$x, x', x''$, and $x'''$ are integers and the total number of $x$'s equal to $2w+2$; and $z$ and $z$ and $w$ are integers equal to one or more; comprising mixing together lactam monomer, polyol, basic lactam polymerization catalyst, and a polyacyl lactam; and polymerizing the lactam, polyol and acyl polylactam to form the block terpolymer.

15. A process according to claim 14 wherein said polyol and said acyl polylactam are reacted before said lactam is added to the polymerization mixture.

16. A process according to claim 14 wherein said polyol and said acyl polylactam are reacted before said lactam polymerization catalyst is added to the polymerization mixture.

17. A process according to claim 14 wherein said polymerization catalyst is an alkali metal or alkaline earth metal lactam or a halogenated alkaline earth metal lactam.

18. A process according to claim 17 wherein said polymerization catalyst is a bromomagnesium lactam.

19. A process according to claim 14 wherein said acyl polylactam is an acyl bis-lactam.

20. A process according to claim 14 wherein the polymerization reaction of the lactam, polyol and acyl polylactam is carried out at a temperature from about 90° to about 190°C.

21. A process according to claim 14 wherein the polymerizing is carried out at an initial temperature of about 70° to about 100°C and is increased to about 150° to about 180°C during the polymerization reaction.

* * * * *

UNITED STATES PATENT OFFICE
CERTIFICATE OF CORRECTION

PATENT NO. : 3,862,262
DATED : January 21, 1975
INVENTOR(S) : Ross Melvin Hedrick and James D. Gabbert It is certified that error appears in the above-identified patent and that said Letters Patent are hereby corrected as shown below:

Front Page, under "United States Patent" "Hendrick et al" should read ---Hedrick et al ---.

Front Page, line 5, "Ross Melvin Hendrick" should read ---Ross Melvin Hedrick---.

Front Page, abstract, line 18, "acryl" should read ---acyl---.

Column 13, in Table, under heading "Extractables percent", second line, "5.21" should read --- 5.1---.

Signed and sealed this 15th day of July 1975.

(SEAL)
Attest:

RUTH C. MASON
Attesting Officer

C. MARSHALL DANN
Commissioner of Patents
and Trademarks